United States Patent [19]

Larsson

[11] Patent Number: 4,865,891
[45] Date of Patent: Sep. 12, 1989

[54] HOLLOW PROFILE WITH A SURFACE LAYER

[75] Inventor: Lennart Larsson, Malmö, Sweden

[73] Assignee: AB Akerlund & Rausing, Sweden

[21] Appl. No.: 168,876

[22] Filed: Mar. 16, 1988

Related U.S. Application Data

[62] Division of Ser. No. 841,945, Mar. 20, 1986, Pat. No. 4,784,711.

[30] Foreign Application Priority Data

Apr. 4, 1985 [SE] Sweden ................................. 8501701

[51] Int. Cl.[4] .............................................. B32B 1/08
[52] U.S. Cl. .................... 428/35.9; 138/137;
138/138; 138/151; 156/165; 156/201; 220/450;
220/453; 220/461; 428/36.91; 428/114;
493/297
[58] Field of Search ............... 138/128, 137, 151, 138;
156/66, 198, 201, 203, 165; 428/36, 114, 35.9,
36.91; 220/450, 453, 461; 493/297

[56] References Cited

U.S. PATENT DOCUMENTS

| | | |
|---|---|---|
| 2,044,356 | 6/1936 | Keeran . |
| 2,612,910 | 10/1952 | Krupp ................................. 138/128 |
| 3,094,449 | 6/1963 | Sisson . |
| 3,172,571 | 3/1965 | Marchak ......................... 138/128 X |
| 3,485,907 | 12/1969 | Quackenbush et al. . |
| 3,551,243 | 12/1970 | Schuur et al. . |
| 3,600,918 | 8/1971 | Lemelson . |
| 3,686,744 | 8/1972 | Mazuir et al. . |
| 4,231,832 | 11/1980 | Weikert . |

Primary Examiner—Robert A. Dawson
Attorney, Agent, or Firm—Lerner, David, Littenberg, Krumholz & Mentlik

[57] ABSTRACT

A surface layer is applied to an elongated, deformable hollow profile. The profile originally has at least one wall portion which is curved as seen in cross section. The profile is advanced to a device for applying the surface layer and pressed so as to deform the curved wall portion into a shape which, as seen in cross section, is substantially straight. The surface layer is applied to this wall portion while it is in the substantially straight shape, and the profile is then at least substantially returned to its original shape.

15 Claims, 5 Drawing Sheets

HOLLOW PROFILE WITH A SURFACE LAYER

This is a division of application Ser. No. 841,945, filed 3/20/86 and now U.S. Pat. No. 4,784,511.

FIELD OF THE INVENTION

The present invention relates to application of a surface layer, for instance lamination of or application of print onto elongated bodies basically of such a type that the cross section shape thereof is deformable by a force acting onto the body and which returns more or less to the original shape as soon as the force is removed.

By "elongated body" is understood for instance a pipe, or other type of profile that needs the actual surface layer, for instance bodies for laminate tubes. The application of the surface layer according to the invention is a "continous process" basically applied to a profile or a body of an arbitrary length. The surface layer application process according to the invention preferably is used in-line when manufacturing an elongated body of the type mentioned.

BACKGROUND OF THE INVENTION

The problem according to the invention is to improve the efficiency of laminating operations where a surface layer is applied to or where the lamination is made onto elongated bodies. The surface layers that are meant are non-extrudable layers, for instance layers containing metal foil or layers obtained by some sort of printing operation.

Further, tuhe problem is to accomplish a continuous, when applicable, an in-line lamination of bodies which for instance are extruded from an extruder and cut into predetermined lengths after the lamination process.

It is known to apply surface layers onto profiles of several kinds.

There are for instance so called composite containers where the "surface layers" sometimes are spirally wound, sometimes obtained as a so called wrapper.

It is known to take advantage of the "return tendency" of flexible hollow bodies when a so called wrapper type surface layer is applied onto a hollow body having a non-circular cross section.

The known methods and devices, however, lack the simplicity and utility, respectively, which would be of advantage in this context.

The known methods are very strongly machinery related, meaning that change of size is very difficult to accomplish.

Within the packaging industry there is a specific desire to accomplish the size setting by simple means. The problem has been very annoying as long as can be remembered, especially in connection with continous manufacturing processes.

OBJECT OF THE INVENTION

In order to eliminate the problems and shortcomings there is suggested, according to the present invention, a method of applying a surface layer onto a hollow profile which is such that the cross section of the original shape thereof is deformable by a force acting onto the profile and which returns to a shape substantially corresponding to the original shape as soon as the force is removed.

SUMMARY OF THE INVENTION

The method is distinguished in that a longitudinal, in the cross-wise direction non-planar section is led against a device for applying a surface layer, that the device for applying the surface layer is arranged to press the non-planar section to a generally planar state when the profile passes the device, that the surface layer is applied between said device and the outside of said section of the profile which has been pressed into a substantially planar shape, and that the profile section with the surface layer thereon is brought to return to a shape at least substantially corresponding to the original shape of the profile section.

In one embodiment the device for applying the surface layer is selected such that it comprises a print applying unit for accomplishing a desired decorative print or an information containing print.

In another embodiment the method is distinguished in that the surface layer applicator device is selected such that it comprises a pressing means, that the pressing means is arranged to press the non-planar section when the profile passes over the pressing means, that a strip comprising a material for said surface layer is led in the longitudinal direction of the profile between said pressing means and the outside of the section of the profile which has been pressed into a substantially planar state, that the strip is attached against the profile, and that the profile section with the strip is allowed to return to a shape which at least substantially corresponds to the original shape of the profile section.

According to a further embodiment of the invention the method is such that the profiles with said longitudinal, in the crosswise direction thereof non-planar section are led over a mandrel which has a planar support surface facing the profile, that the pressing means is arranged to press the non-planar cross section till abutment against the support surface when the profile passes over the mandrel, and that said strip is led between the pressing means and the outside of the section of the profile that has been pressed against the planar support surface.

In a practical preferred embodiment the method preferably is such that two opposite sections of the profile are led over each one of two support surfaces arranged in parallel planes, that a pressing device is arranged over each one of said parallel planes, that a strip is led between each pressing device and the outside of a respective section of a profile that has been pressed into abutment against the support surface, that the strips are attached onto the profile, and that the profile sections with the strips are allowed to return to a shape substantially corresponding to the original shape of the profile section.

In order to obtain a lamination covering the whole surface, the method preferably is such that pair-wise strip application using support surfaces is repeated during the continued forwarding of the profile until the entire outer surface of the profile is covered by the strip material.

The method is especially well suited where the strip application is carried out in-line onto an extruded pipe shaped profile, preferably of a thermoplastics material.

In one embodiment the profile is extruded with a circular cross section, and the support surfaces are arranged parallel to the longitudinal axis of the profile.

In order to accomplish an application of strips covering the entire surface there are arranged at least two successive parallel pairs of planar support surfaces following to each other in the extrusion direction.

The choice of material for the strips involves a plurality of possibilities, and qualified barrier properties may be obtained by a material which is substantially gas- and vapour tight, for instance a metal foil. In order to guarantee an acceptable gas- and vapour barrier the strips are applied such that they are placed at least edge against edge around the entire circumference of the extruded profile.

In all embodiments, in order to reduce the strain in the edge region, it is possible to arrange the pressing together of the non-planar sections such that opposite insides of the profile are brought into abutment against each other along a distance in the cross-wise direction considerably shorter than a distance corresponding to a fully pressed together profile.

The present invention also supplies a device for carrying out a method for applying a surface layer onto a profile which is such that the cross section shape thereof is deformable by a force acting onto the body and which returns to a shape substantially corresponding to the original shape as soon as the force is removed. The device is characterized by means for guiding the profile, which has an longitudinal non-planar section in the cross-wise direction, against a unit for applying a surface layer onto the body, and in that the device comprises means for placing the surface layer between the unit and the outside of the section of the profile which has been pressed into a substantially planar state by the surface layer applicator unit.

In one embodiment the unit for applying a surface layer comprises a unit for applying an information containing print.

According to another embodiment the surface layer applicator unit comprises a pressing device arranged for pressing the non-planar section into a substantially planar shape when the profile is passing over the pressing device, and means for feeding a strip comprising material for said surface layer in the longitudinal direction of the profile between the pressing device and the outside of the section of the profile which has been pressed into a substantially planar state.

According to a further embodiment of the invention the device is distinguished in that said means for feeding the profile against the surface layer applicator device comprises a mandrel having a planar support surface facing the inside of the profile, in that a pressing device is arranged for pressing the non-planar section into abutment against the support surface when the profile is passing over the mandrel, by a device for feeding a strip, comprising a material for said surface layer, between the pressing device and the outside of the section of the profile which has been pressed against the planar support surface, and by a device for attaching the strip to the profile.

Preferably the mandrel comprises two successive sections each one having two plane parallel sides, where successive pairs of plane parallel sides form different angles relative a reference plane along the longitudinal axis of the profile.

In order to reduce the mechanical strains and thereby the risk for cracks in the edge areas of the pressed together profile, in all embodiments the member of the surface layer applicator unit which presses together the profile may be such that opposite insides of the profile are brought into abutment against each other along a distance in the cross-wise direction which is shorter than a distance corresponding to a completely pressed together profile.

DESCRIPTION OF PREFERRED EMBODIMENTS

Figure 1:
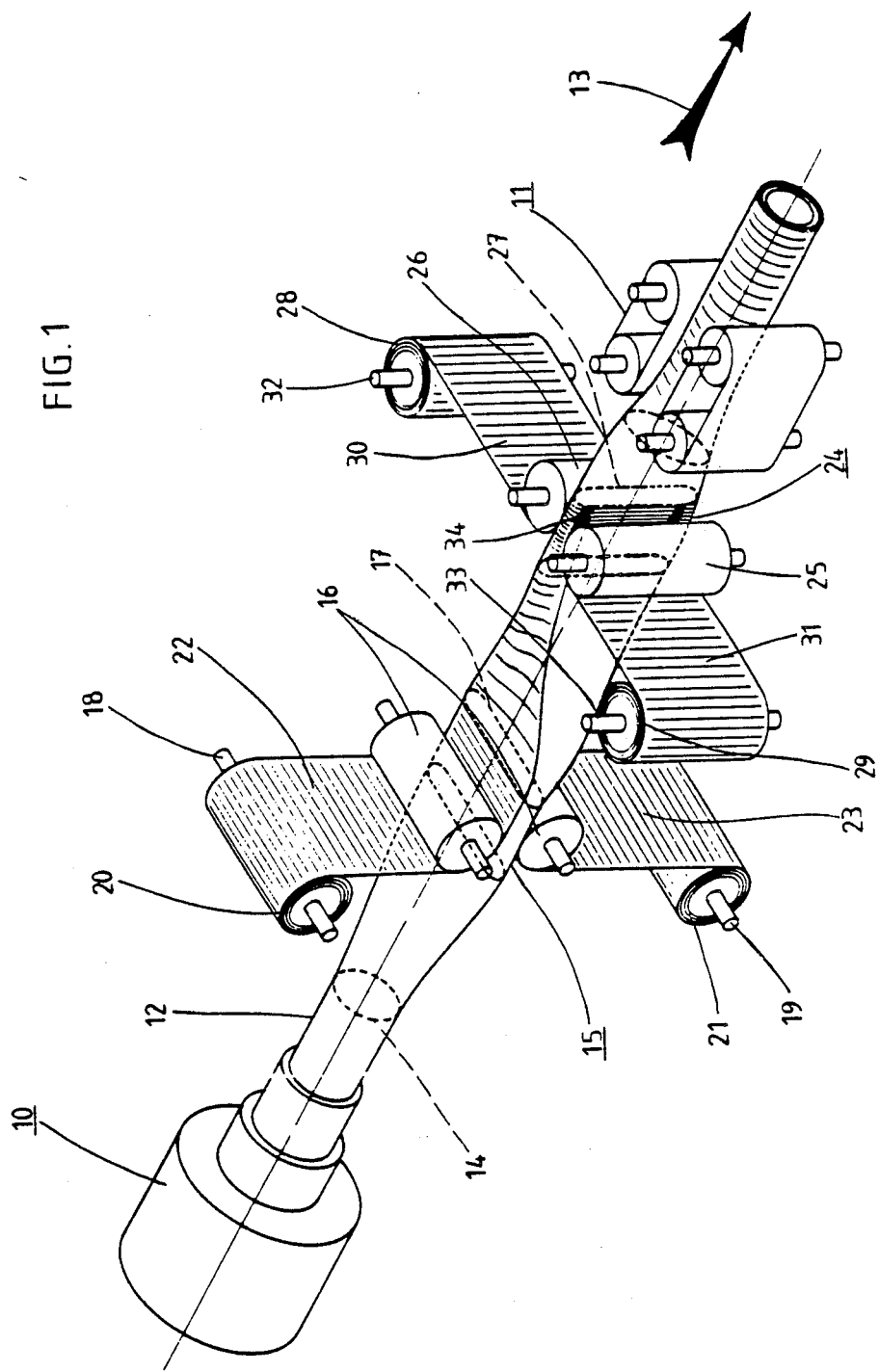
FIG. 1 in a perspective view shows a strip applicator.

In FIG. 1 a hollow profile 12 is extruded from an extruder 10 and pulled in the direction of the arrow 13 by means of a pulling bench. The profile may be obtained from any extrudable material or combination of materials of such characteristics that the profile of an actual wall thickness has a cross section shape which is deformable by a force acting cross-wise the profile and which returns to a shape substantially corresponding to the original shape as soon as the force is removed. As used in this disclosure, the term "resilient" means having an inherent tendency or capability to recover its original shape after deformation.

Thermoplastics material, for instance polyolefine plastics, especially polypropylene are materials which may be used with advantage in the process and machinery. As an example of dimension/wall thickness the interval 0.2 to 2.0 mm may be mentioned.

The cross section shape of the extruded profile may of course be selected within wide limits, as well as the dimensions. A common characteristic feature of actual profiles is that a profile has at least one longitudinal non-planar section in the cross-wise direction. That is, the profile includes at least one wall portion which, in cross section, is curved. As used in this disclosure with reference to a wall portion of a profile, the term "curved in cross-section" means that the wall portion when seen in a cross sectional view taken on a cutting or projection plane transverse to the direction of elongation of the profile, defines a curve rather than a straight line. In the figures the extruded cross section 14 has been shown as a circular one. Thus, all portions of the profile or extruded cross section 14 are curved in cross section.

In a first station 15 there are arranged pair of pressing rollers 16 which operate substantially horizontally against the profile for transferring the section into the cross section 17, i.e. a cross section having parallel planar sides. These pressing rollers thus press or temporarily distort the original profile so as to transform two opposed wall portions which are original curved in cross section into shapes which are straight in cross section. A shape which is "straight in cross section" means a shape which defines a straight line when seen in a cross sectional view taken on a cutting or projection plane transverse to the axis of elongation of the profile. Thus, in section 17 of the two opposite parallel sides define straight lines.

Onto shafts 18, 19 journalled in the machinery stand (not shown) there are supported rollers 20, 21 of strips 22, 23 of a material chosen to form the intended surface layer. In that case where the surface layer is used for giving the profile first class barrier characteristics the strips 22, 23 comprise a metal layer or a metallized plastics film.

The width of the strip in FIG. 1 is such that it is somewhat wider than a fourth of the outer circumference.

In the station 24 there are arranged a pair of vertical pressing rollers 26 which provide a cross section 27 having two planar vertical sides. The rollers 28, 29 which are vertically journalled onto shafts 32, 33 comprise a strip material 30, 31 and are arranged for providing a strip between each pressing roller 25, 26 and the flattened profile.

The strips 22, 23 as well as the strips 30, 31 are applied in the longitudinal direction of the profile and are brought to adhere onto the outer layer of the profile in any suitable manner. For instance the roller pairs 15 and 24, respectively, may comprise means for activating a thermoplastic coating on the strips and on the profile. Usually this means heating followed by cooling. It is however possible to use glue, for instance a two component glue.

In the shown embodiment the strips 30, 31 have substantially the same width as the strips 22, 23. The overlap 34 obtained in this way guarantees tight joints in the longitudinal direction of the profile.

The distance between the stations 15 and 24 is selected such that the first strip pair is brought to securily adhere to the profile before flattening thereof for obtaining the cross section 27.

Already in the pulling bench 11 the profile 12 has returned to a shape substantially corresponding to the original shape.

Further down in the production line, in the direction of the arrow 13, there for instance may be arranged a cutter which cuts the profile into suitable lengths. Each such length thereafter for instance is provided with an end piece which is tightly sealed to the sleeve. Thereafter the sleeve provided with said end piece may be delivered as an unfilled package together with an additional sealable end piece.

The package may also have the shape of a tube implying that a tube breast is applied onto the sleeve before filling and end sealing. The method is also well suited for continous in-line manufacturing of laminate tubes.

Figure 2:
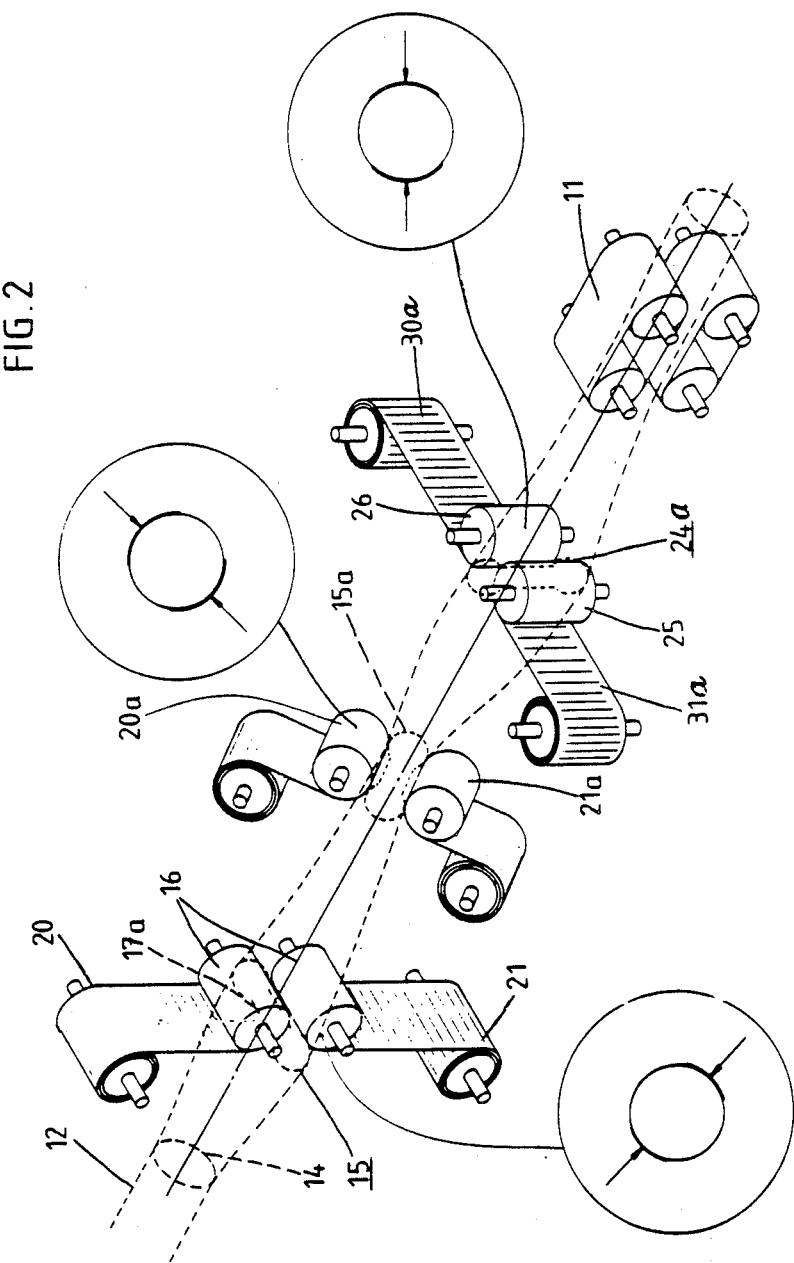
FIG. 2 shows the strip applicator according to another embodiment.

In FIG. 2 there are used press rollers 11 and 25, 26, respectively, of a width and height, respectively, less than in FIG. 1, meaning that corresponding insides of the profile may be pressed into tight abutment against each other without any risk for cracks in the edge regions of the profile. As shown in FIG. 2 the cross section 17a comprises end beads of a longer radius than in FIG. 1. Such radius means reduction of the mechanical strain that otherwise would be obtained.

Figure 3:
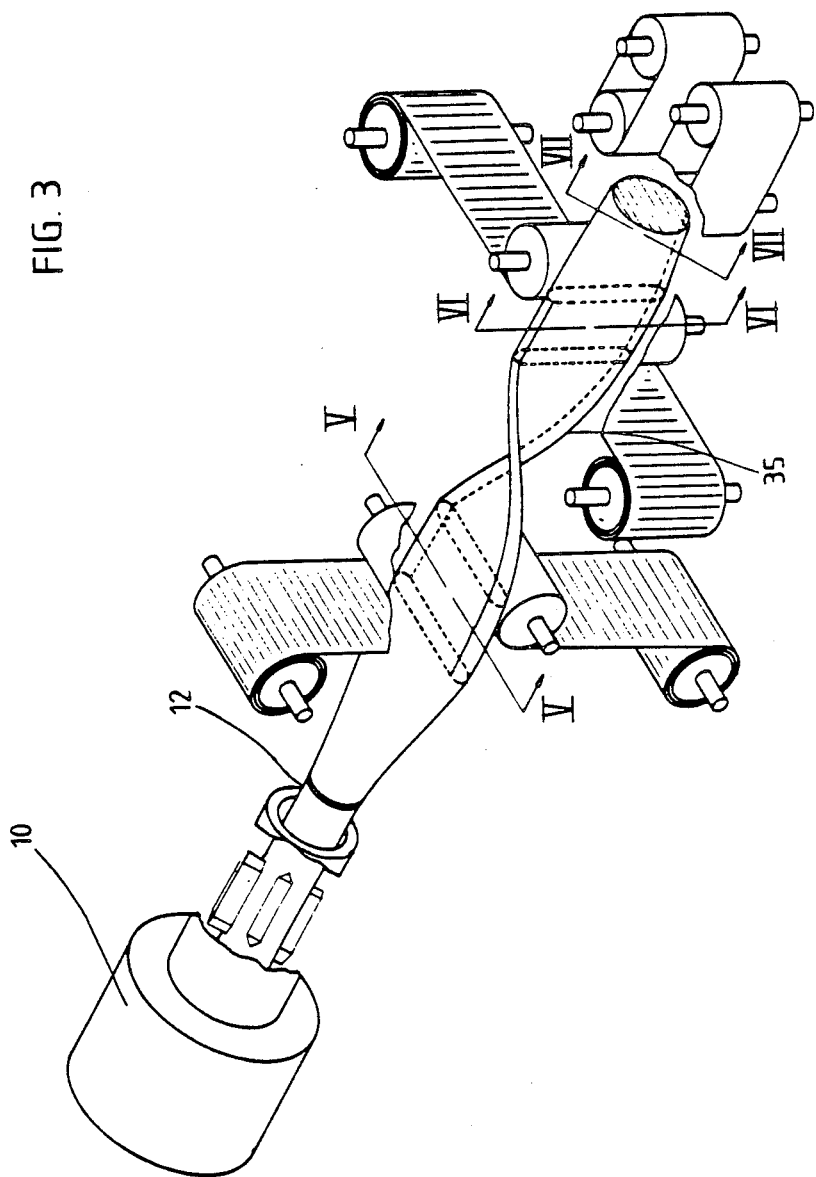
FIG. 3 shows a further embodiment of the strip applicator with auxiliary equipment, FIG. 4 in a perspective view schematically shows a surface applicator device in the shape of a printing device.

In the stations 15a and 24a there are applied further strips 20a, 21a and 30a, 31a, such that the profile is completely covered by the strip material. Overlap is varied from time to time and is optional. It is of course also possible to leave uncoated longitudinal regions by simply eliminating the stations 15a, 24a. In FIG. 3 the arrangement resembles the one in FIG. 1, but with the difference that there is a mandrel 35 acting as a support for positively defining the sections 17 and 27 in the stations 15 and 24. The mandrel is supported in the manner shown in the head of the extruder 10 without interferring with the flow of material. Preferably the mandrel has a coupling of the fast type meaning that it may be inserted simply through a longitudinal cut after the extruder has been started up.

There may of course also be a mandrel in the arrangement according to FIG. 2.

Figure 4:
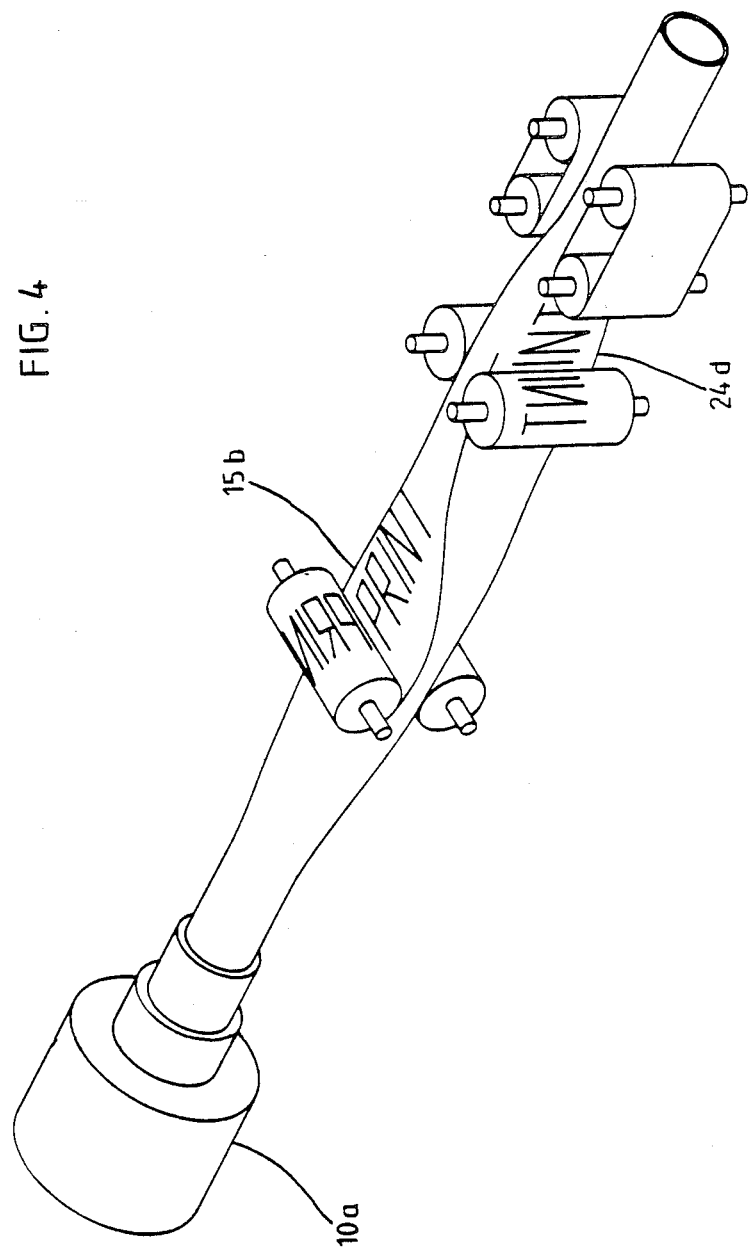

In FIG. 4 there is shown a printing device 15b, 24d as the device for applying the surface layer. Such device may be of several different designs for giving the desired print. The use of a mandrel as well as pressing together a central tube section to close abutment for providing edge beads of a longer radius and thereby reduced strain in the pressed together material is also possible to accomplish in these arrangements.

Figure 5:
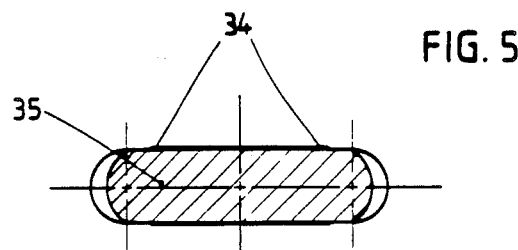
FIG. 5 is a section along line V—V in FIG. 3.
Figure 6:
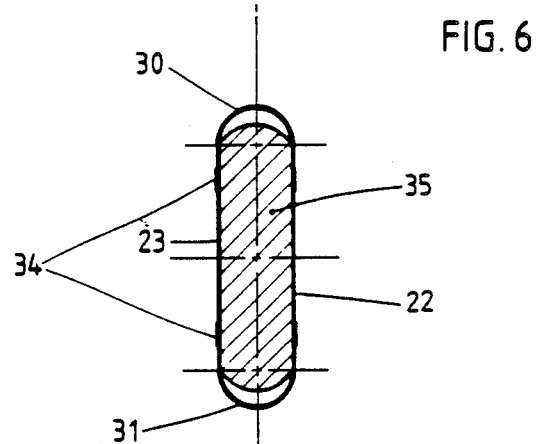
FIG. 6 is a section along line VI—VI in FIG. 3.
Figure 7:
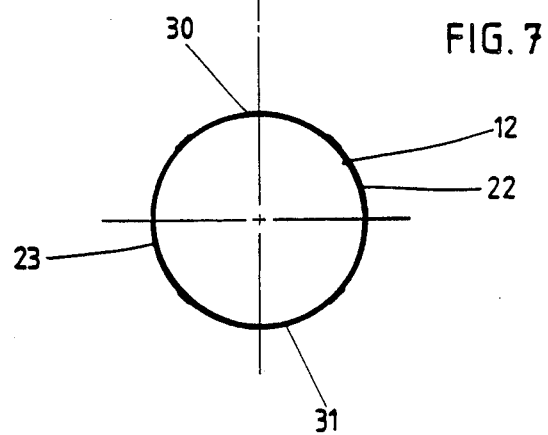
FIG. 7 is a section along line VII—VII in FIG. 3.

Finally, in FIGS. 5, 6 and 7 there are shown partial sections along lines identified by the same numbers in FIG. 3.

The invention has been described by reference to specific embodiments, but the purpose is of course that the inventive idea should be limited merely by the accompanying claims.

We claim:
1. A sleeve for forming a container comprising:
   (a) a hollow, tubular body defining a pair of open ends and a longitudinal direction extending between said ends, said body having a predetermined cross-sectional shape and tending to return to said cross-sectional shape upon deformation, said body having an exterior surface, at least a portion of said exterior surface being curved in said cross-sectional shape; and
   (b) a plurality of elongated strips of a sheetlike material closely overlying and adhering to said exterior surface of said body, each of said strips having a pair of lengthwise edges extending substantially parallel to the longitudinal direction of said body, said strips being contiguous with one another so that said strips define a plurality of joints extending substantially parallel to said longitudinal direction, said strips cooperatively covering the entire exterior surface of said body.
   said body having a thermoplastic wall defining said exterior surface.
2. A sleeve as claimed in claim 1 wherein two of said strips overlap one another at each of said joints.
3. A sleeve as claimed in claim 1 wherein said wall is between 0.2 and 2.0 mm. thick.
4. A sleeve as claimed in claim 1 wherein the thermoplastic material of said wall includes a polyolefin.
5. A sleeve as claimed in claim 4 wherein said polyolefin includes polypropylene.
6. A sleeve as claimed in claim 1 wherein each of said strips includes a substantially gas-tight material.
7. A sleeve as claimed in claim 6 wherein said gastight material is selected from the group consisting of metal foils and metallized plastic films.
8. A container comprising
   (a) a sleeve having
       (1) a hollow, tubular body defining a pair of open ends and a longitudinal direction extending between said ends, said body having a predetermined cross-sectional shape and tending to return to said cross-sectional shape upon deformation, said body having an exterior surface, at least a portion of said exterior surface being curved in said cross-sectional shape; and
       (2) a plurality of elongated strips of a sheetlike material closely overlying and adhering to said exterior surface of said body, each of said strips having a pair of lengthwise edges extending sub- stantially parallel to the longitudinal direction of said body, said strips being contiguous with one another so that said strips define a plurality of joints extending substantially parallel to said longitudinal direction, said strips cooperatively covering the entire exterior surface of said body; and:

(b) means for closing said open ends of said sleeve.

9. A container as claimed in claim 8 wherein two of said strips overlap one another at each of said joints.

10. A container as claimed in claim 8 wherein said body has a thermoplastic wall defining said exterior surface.

11. A container as claimed in claim 10 wherein said wall is between 0.2 and 2.0 mm. thick.

12. A container as claimed in claim 10 wherein the thermoplastic material of said wall includes a poloyefin.

13. A container as claimed in claim 12 wherein said polyolefin includes polypropylene.

14. A container as claimed in claim 10 wherein each of said strips includes a substantially gas-tight material.

15. A container as claimed in claim 14 wherein said gas-tight material is selected from the group consisting of metal foils and metallized plastic films.

* * * * *